(No Model.) 2 Sheets—Sheet 2.
J. D. VOAK.
VENTILATING APPARATUS FOR RAILWAY CARS, FACTORIES, &c.
No. 376,494. Patented Jan. 17, 1888.
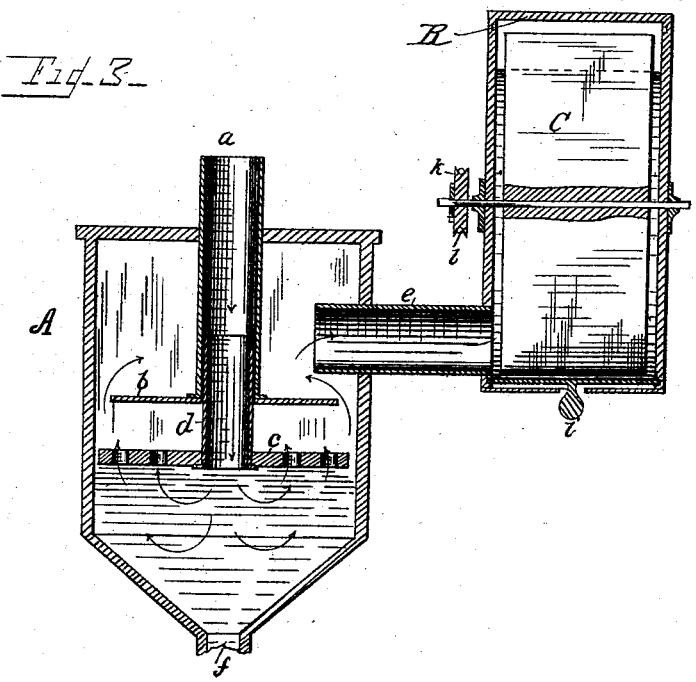
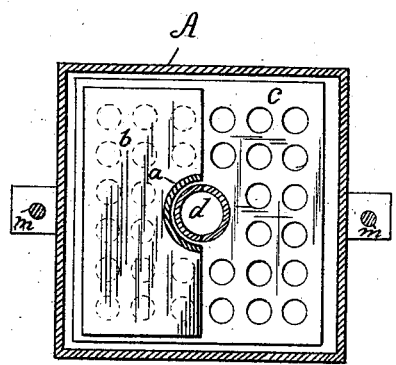
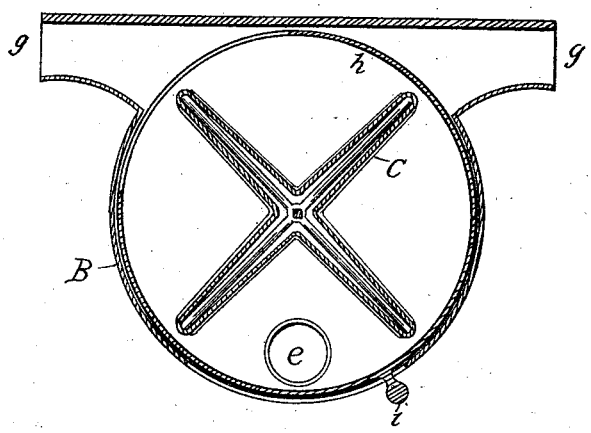
Witnesses
James D. Voak, Inventor
By his Attorney

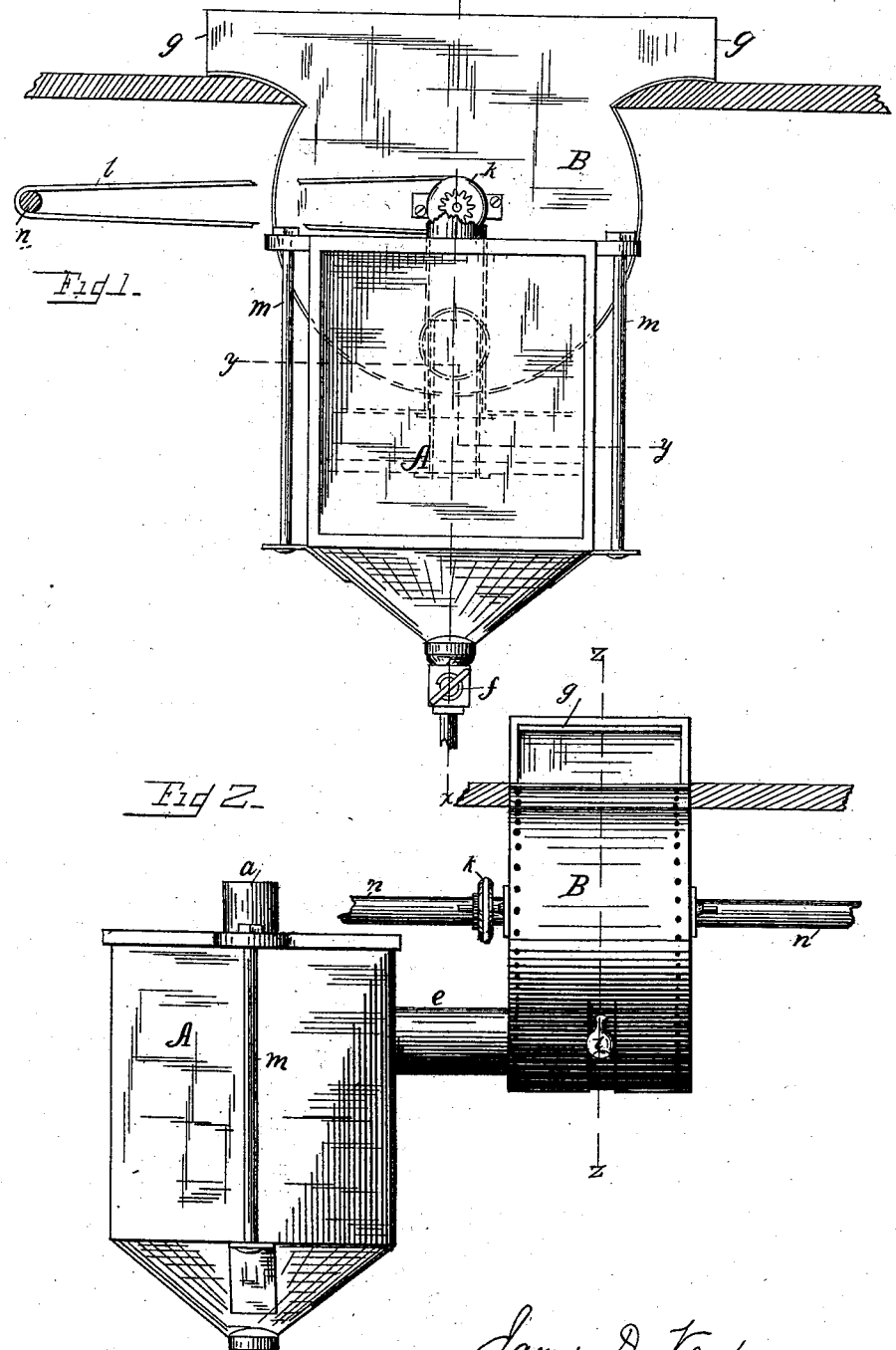

United States Patent Office.

JAMES D. VOAK, OF WATKINS, NEW YORK.

VENTILATING APPARATUS FOR RAILWAY-CARS, FACTORIES, &c.

SPECIFICATION forming part of Letters Patent No. 376,494, dated January 17, 1888.

Application filed March 16, 1886. Serial No. 195,452. (No model.)

*To all whom it may concern:*

Be it known that I, JAMES D. VOAK, a citizen of the United States, residing at Watkins, in the county of Schuyler and State of New York, have invented certain new and useful Improvements in Ventilating Apparatus for Railroad-Cars, Factories, and other Buildings; and I do hereby declare the following to be a full, clear, and exact description of the invention, such as will enable others skilled in the art to which it appertains to make and use the same.

This invention has for its object the ventilation of railroad-cars, factories, mills, and the different apartments of buildings in which steam or other motive power is used, the fresh air supplied being first purified by passing it through water or other fluid before its discharge into the apartment. The system is herein described as applied to railroad-cars, the motive power being supplied by the axle of the car; but the necessary motive power may be obtained from the gearing of a mill or factory.

The invention consists in the mechanical devices and combinations, hereinafter more fully described, and is illustrated by the accompanying drawings.

Figure 1 is a side elevation of a water or fluid tank and a drum inclosing a fan or blower. Fig. 2 is a front elevation. Fig. 3 is a sectional view on the line $x$ $x$ of Fig. 1. Fig. 4 is a section on the line $y$ $y$ of Fig. 1. Fig. 5 is a section on the line $z$ $z$, Fig. 2.

I make use of a tank, A, of any desirable shape, partly filled with water or other fluid, and provided with a pipe, $a$, for the admission of air from without. This pipe extends downward about half-way within the tank, and has affixed upon its lower part, horizontally, a flat diaphragm, $b$, which acts as a deflector to prevent the agitated water below it from reaching to or entering the outlet-pipe. Beneath this deflector is a foraminated float, $c$, having in its center and extending upward the short pipe $d$, working within the inlet-pipe $a$ and fitting closely, so that the air entering from without must pass into the fluid beneath the float and be distributed thoroughly. The tank has an outlet-pipe, $e$, on the side and above the deflector for the escape of the air after it has been purified by passing through the water or fluid. The water in the lower part of the tank can be withdrawn, when it is necessary to change it, by means of the tube and stop-cock $f$ at the bottom. The top or lid of the tank is firmly secured in its place by the rods and bolts $m$ $m$, and may be removed when necessary to adjust or repair the float or deflector within.

The outlet-pipe $e$ connects with a drum, B, which incloses the double-acting fan C. This drum has double outlets $g$ $g$ at its upper part. To these outlets may be attached conducting-pipes, or any convenient mode of distributing the air. It is provided with a slide or valve, $h$, by means of which the air can be discharged in either direction, according to the motion of the cars or driving machinery. The valve is so arranged that the whole volume of air may be discharged from one opening, or the quantity of air desired regulated by partially closing the valve. The valve is operated by the thumb-piece $i$.

The fan C is revolved by the pulley or whirl $k$, connected by a belt or rod, $l$, with the axle $n$ of a car or gearing of the motive power. The fan will operate in either direction, whether the car be moving backward or forward.

I am aware that devices for ventilation have been contrived, by which it is attempted by means of a blower to force external air into or through a body of water, the blower being attached to or driven by the motion of the axle of a railroad-car. My system differs from all these devices, inasmuch as the free air above the fluid is exhausted by the motion of the fan, and a vacuum thus created which can only be filled by the external air rushing through the inlet-pipe and into the body of the fluid, by which it is purified. It will be found by experience with my system that, no matter how much the external air may be charged with dust, smoke, or other foreign and disagreeable matter, it is perfectly purified by being drawn through the water in this manner, and that this plan is the only practicable means of obtaining a supply of fresh air thoroughly purified from deleterious matter.

The pure air obtained by this method may be cooled by adding ice to the water in the tank or surrounding it with a vessel containing ice, or it may be heated by steam or other means that will readily suggest themselves; but the main object of my invention is to form a vacuum to induce the current of air to pass through water or other fluid for the purpose of cleansing the air from impurities before it enters the apartment to be ventilated.

What I claim as of my invention, and desire to secure by Letters Patent, is—

1. In a ventilating apparatus, the combination of an exhaust-fan inclosed in a drum connected by the pipe $e$ with a purifying-tank provided with the perforated float $c$, short pipe $d$, working within and extending the inlet-pipe $a$, and rising and falling with the body of water in the tank, substantially as specified and shown, and for the purposes stated.

2. In a ventilating apparatus, the combination of a double-acting fan inclosed in a drum having apertures for the discharge of air at opposite ends and provided with the shifting valve $h$, with a purifying-tank having the solid or perforated deflector $b$, affixed upon the inlet-pipe $a$ above the body of water and below the connecting-pipe $e$, substantially as shown and described, and for the purposes set forth.

3. In a ventilating apparatus, the drum B, provided with the outlets $g$ $g$ and valve $h$, and inclosing the double-acting fan C, in combination with the tank A, having inlet and outlet pipes $a$ and $e$, the deflector $b$, and float $c$, substantially as described and shown, and for the purposes stated.

In testimony whereof I affix my signature in presence of two witnesses.

JAMES D. VOAK.

Witnesses:
N. W. ABBEY,
MORRIS T. BANKS.